(12) United States Patent
Teruggi et al.

(10) Patent No.: US 6,568,410 B1
(45) Date of Patent: May 27, 2003

(54) MACHINE FOR THE TREATMENT OF PRODUCTS MADE OF PLASTIC MATERIAL OF THE RECYCLABLE TYPE

(75) Inventors: Piergiorgio Teruggi, Fontaneto d'Agogna (NO) (IT); Enrico Sereni, Reggio Emilia (IT)

(73) Assignee: Amut S.P.A., Novara (IT)

( * ) Notice: Subject to any disclaimer, the term of this patent is extended or adjusted under 35 U.S.C. 154(b) by 0 days.

(21) Appl. No.: 09/674,268

(22) PCT Filed: Apr. 29, 1998

(86) PCT No.: PCT/IT98/00109
§ 371 (c)(1),
(2), (4) Date: Dec. 29, 2000

(87) PCT Pub. No.: WO99/55508
PCT Pub. Date: Nov. 4, 1999

(51) Int. Cl.[7] .............................. B08B 3/06; B02C 19/12
(52) U.S. Cl. ....................... 134/120; 134/159; 241/99
(58) Field of Search ................................ 134/61, 63, 78, 134/79, 119, 120, 159, 163; 241/99

(56) References Cited

U.S. PATENT DOCUMENTS

| | | | |
|---|---|---|---|
| 3,754,559 A | * 8/1973 | Seiwert | ................... 134/104.1 |
| 3,973,573 A | * 8/1976 | Seiwert | ................... 134/104.4 |
| 5,180,437 A | * 1/1993 | Anderson et al. | ............. 134/10 |
| 5,185,041 A | 2/1993 | Anderson | ................... 134/25.1 |
| 5,203,359 A | 4/1993 | Fesmire | ................... 134/61 |
| 5,211,841 A | * 5/1993 | Krempp et al. | ............. 100/148 |
| 5,375,778 A | 12/1994 | Lundquist | ................... 241/24 |

FOREIGN PATENT DOCUMENTS

| | | |
|---|---|---|
| DE | 3733649 | 3/1989 |
| DE | 4222119 | 1/1994 |
| DE | 4320000 | 5/1994 |
| DE | 4323386 | 1/1995 |
| FR | 2738759 | 3/1997 |
| WO | 9749494 | 12/1997 |

\* cited by examiner

*Primary Examiner*—Randy Gulakowski
*Assistant Examiner*—Joseph Perrin
(74) *Attorney, Agent, or Firm*—Millen, White, Zelano & Branigan, P.C.

(57) ABSTRACT

A machine for the treatment of products made of plastic material of the recyclable type comprises a drum rotating about one of its own axis, at least one inlet for the introduction of the products to the inside of the drum and means for feeding a treatment fluid to the inside of the drum, the latter comprising one or more sections having a perforated side wall and one or mode sections having a discontinuous side wall.

20 Claims, 2 Drawing Sheets

MACHINE FOR THE TREATMENT OF PRODUCTS MADE OF PLASTIC MATERIAL OF THE RECYCLABLE TYPE

The present invention relates to a machine for the treatment of products made of plastic material of the recyclable type, for instance bottles or the like and, in particular, a machine that allows such products to be treated in a continuous process.

DESCRIPTION OF RELATED ART

The products in plastic material containing one or more recyclable parts are generally sent to the recycling plants in different forms, for instance in loose form or as bales or blocks comprising a plurality of compacted products. In the latter case, in order to allow the recovery treatment to be carried out, the compacted blocks must be disgregated for obtaining the separation, or singularization, of each product, as happens for instance in the plants for the recovery of PET from the common bottles use for drinks, mineral waters and the like.

Subsequent to the singularization phase, or simultaneous with it, the bottles are subjected to one or more washing phases with a treatment fluid, possibly heated, for removing the waste materials comprising for example labels made of paper or plastic material fixed to the bottles by means of adhesive or the like.

The only known example relating to a machine which allows the separation of bottles and their simultaneous washing in a continuous way, is disclosed in the European Patent Nr. EP-0558528. Indeed, this document discloses a machine which allows to carry out the disaggregation of the compacted agglomerates of bottles and their simultaneous washing. This is made by means of a combination of the mechanical action of bodies that strike the blocks of compacted bottles and the thermo-hydraulic action of the treatment fluid.

In general, the machine disclosed in the cited European Patent, comprises a hollow cylinder which rotates about a horizontal axis. It is provided an inlet, regulated by means of a suitable valve, through which the bottles are feed in a bulk form, i.e. as compacted aggregates as well as single bottles. It is further provided an outlet, also regulated by a suitable valve, through which the singularized bottles are withdrawn. Inside the cylinder there are provided means for mechanically disaggregating the agglomerates of bottles and means for feeding a treatment fluid at a pre-set temperature.

The inside of the treatment cylinder is divided into chambers, separated by walls equipped with ample central openings, through which the bottles are conveyed successively due to the action of one or more helically arranged blades arranged on the inside wall of the cylinder. In the chambers near the inlet for the bottles, there are floating or suspended bodies which strike the agglomerates of bottles and facilitate the disaggregation of the same.

One of the main characterising aspects of the machine disclosed in the cited European Patent is that the cylinder is provided with a continuous side wall that allows a predetermined volume of the treatment liquid to be retained inside the cylinder. The excess liquid flows out from the central openings arranged at the opposite extremities of the cylinder.

The machine described in the cited European Patent must have particularly large dimensions, both to guarantee a high working capacity and to keep the bottles inside the rotating cylinder for a sufficiently long time in order to ensure the effectiveness of the washing and separation treatment.

The treatment is therefore carried out by subjecting continuously the bottles, and the agglomerates of the same, to immersion on the treatment liquid. As well as requiring considerable quantities of treatment liquid remaining inside the cylinder, the treatment carried out with this known machine causes inevitably the filling, even only in part, of the bottles with the liquid itself.

This is particularly undesirable, especially by taking into account the fact that the treatment liquid stored in the bottles contains chemical additives or pollutants which may be dispersed during the subsequent steps of the treatment in the environment where the plant is located. Furthermore, the presence of the treatment liquid on the bottles causes a considerable waste of the liquid itself and may interfere with the subsequent phases of transferring and working of the bottles, even only taking into account the increased weight due to the presence of the treatment liquid inside the bottles.

In order to avoid these notable drawbacks, the known plants which comprise a machine such that disclosed in the cited European Patent require a further station, located immediately downstream to the machine, in which it is carried out the emptying of the treatment liquid from the bottles before transferring them to the subsequent working stations.

Furthermore, the presence of separator partitions and the expulsion of the waste materials (labels, stoppers or the like) by means of the treatment liquid that flows out through the central openings arranged to the extremities of the cylinder, makes the same evacuation of such materials difficult and not very efficient. In particular, also in the case of a continuous working process, there must be provided a further screening step in order to allow the complete separation between the bottles and the waste materials.

SUMMARY OF THE INVENTION

This being stated, one object of the present invention is to propose a machine of the type specified above, that allows to carry out in a continuous way the disaggregation of the blocks of compacted products, the pre-washing of the products and the ejection of the singularized products at the same time.

Another object of the present invention is to produce a machine of the type specified above which reduces considerably the waste of fluid used during the treatment.

A further object of the present invention is to produce a machine of the type specified above that allows to carry out an effective pre-washing of the products and the evacuation of the majority of the waste materials from the treated plastic products.

Yet another object of the present invention is to produce a machine that allows to treat the products under whatever form, in particular under the form of bales, that is a machine which allows to adapt the treatment of singularization and pre-washing to products independently from the form under which they are fed to the machine, as well as independently from the different characteristics of quality, type and composition.

These purposes are achieved by the present invention, that relates to a machine for the treatment of products made of a plastic material of the recyclable type, in which the products are inserted in the form of blocks consisting of a plurality of compacted products and/or in the form of individual separate products, the machine comprising a drum rotating about one of its own axis, at least one inlet for the introduction of the products to the inside of the drum and means for feeding a treatment fluid to the inside of the drum, characterized in that the drum comprises one or more sections having a perforated side wall and one or more sections having a discontinuous side wall.

This allows to perform in a continuous way and in a single machine three steps of treatment which in the prior art are carried out in three separated stations of the plant. In particular, inside a single machine, it is possible to disaggregate the agglomerates of compacted products, to prewash the products and singularize the same.

Also the removal of the waste material, for instance the paper labels which are softened and removed for the majority during the treatment, is made through the sections having a perforated side wall, while the singularized products are expelled one by one in a continuous way from the sections having a discontinuous side wall.

In particular, the drum comprises a first entry section, that is a section located immediately downstream of the product inlet, having a continuous side wall or a perforated side wall. In the first entry section there are preferably provided some radially projecting blades which facilitate the disaggregation of the bales and/or the aggregated products.

According to an advantageous aspect of the invention, it is provided at least a second section, located immediately downstream of the first entry section, having a perforated side wall formed by a plurality of detachable perforated panels. This allows the installation of panels with holes of different diameter depending on the typical dimensions of the waste material to be evacuated from the machine during the treatment of certain products.

It is further provided a third section having a discontinuous side wall, that is a wall formed by detachable rods that are arranged in equidistant relationship in such a way as to form a plurality of exit ports, having substantially equal shape and dimensions, through which pass the singularized products. The rods can thus be arranged depending on the dimensions of the products to be treated by the machine.

The drum also comprises a trailing section, located immediately downstream of the third section, provided with a central opening and one or more vanes arranged on the internal surface. The vanes are oriented in such a way as to cause, during the rotation of the drum, a thrust action towards the third section on at least part of the materials reaching the trailing section. This allows to carry back the products towards the ports provided in the third section of the drum, while the foreign matters having greater dimensions with respect to the products can cross the trailing section in order to be expelled from the machine.

According to another aspect of the invention, all the sections of the drum are arranged so that one continues from the other without separator walls being placed between the same. This allows continuous and effective evacuation of the waste material and guarantees a continuous flow of products towards the section of discontinuous wall, through which the same products leave the machine.

According to another advantageous embodiment of the invention, there are means for varying the angle of inclination of the axis of rotation of the drum with respect to the ground, together with means for regulating the speed of rotation of the same drum. It is possible with this combination to regulate the treatment time of the products, and so adapt the machine to operate with products having different characteristics. A slight inclination allows the products to move towards the section with discontinuous walls, from which the same products escape one by one from the machine.

The drum is located, at least in part, and rotates within a casing. Both the drum and the casing, or at least part of them, are preferably lined with thermo-insulating material, in such a way as to limit the heat loss suffered by the treatment fluid in the case in which a heated fluid is used. In this case, the fluid can be recovered and re-introduced into the machine, thus saving on the consumption of energy necessary to bring it up to the treatment conditions again.

In the lower part of the casing there are a plurality of outlets, of which a first outlet is located in correspondence with the second section of the drum, i.e. that having a perforated side wall, to allow the treatment fluid and waste materials removed from and/or released by the products to flow out; a second outlet is located in correspondence with the third section of the drum, i.e. that having a discontinuous wall, to allow the products to exit one at a time; and a third outlet is arranged downstream of the drum to allow the ejection of foreign matters (for example nets, cardboards or the like) having dimensions greater than those of the products to be treated.

This allows continuous and effective singularization and pre-washing of the products, and the elimination of the waste material.

BRIEF DESCRIPTION OF THE DRAWINGS

Further advantages and characteristics of the present invention will be more evident from the description that follows, made by way of illustration and not limiting purpose, with particular reference to the attached drawings in which.

DETAILED DESCRIPTION

Figure 1:
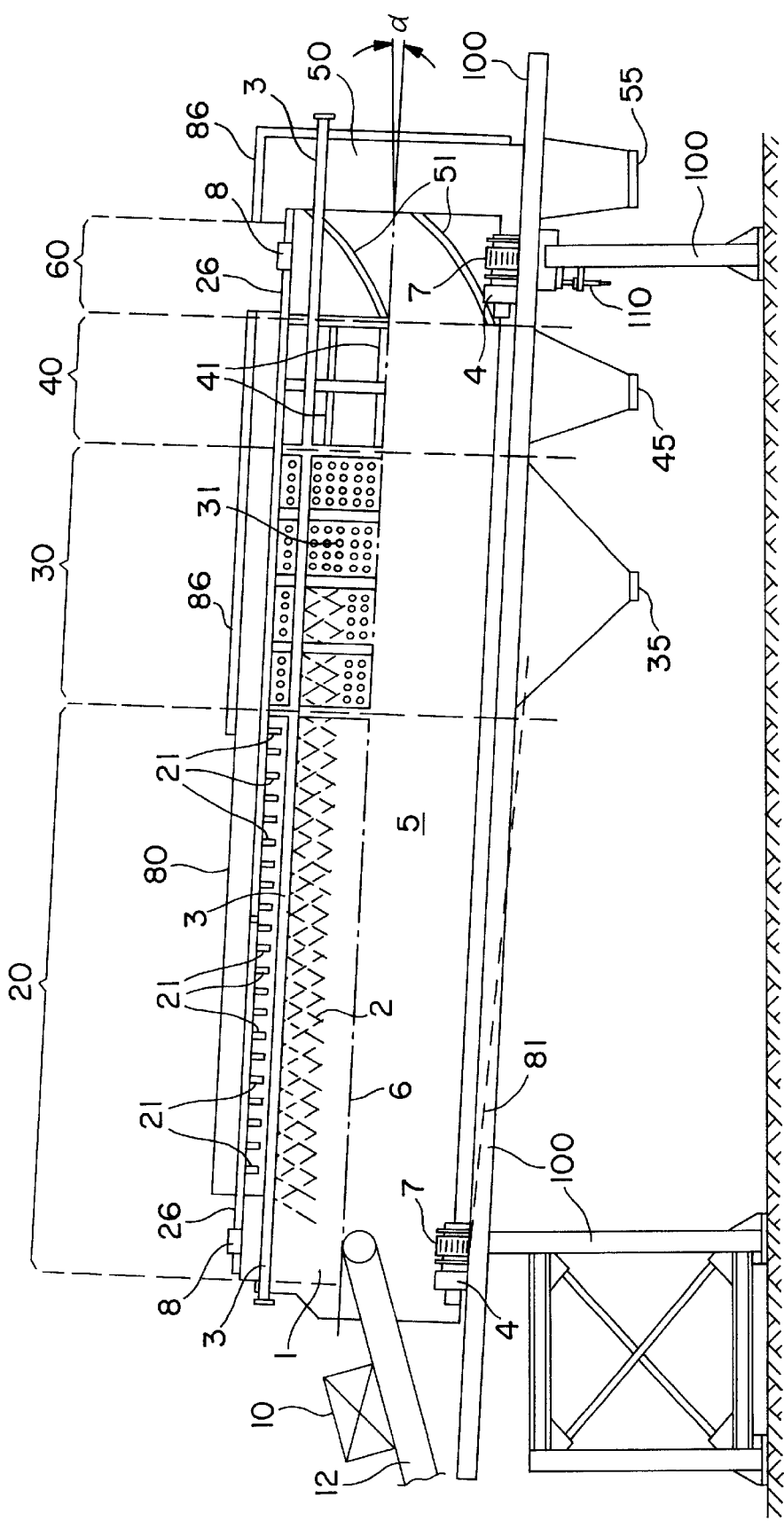
FIG. 1 is a partially sectioned side elevation view of a machine according to the present invention.
Figure 2:
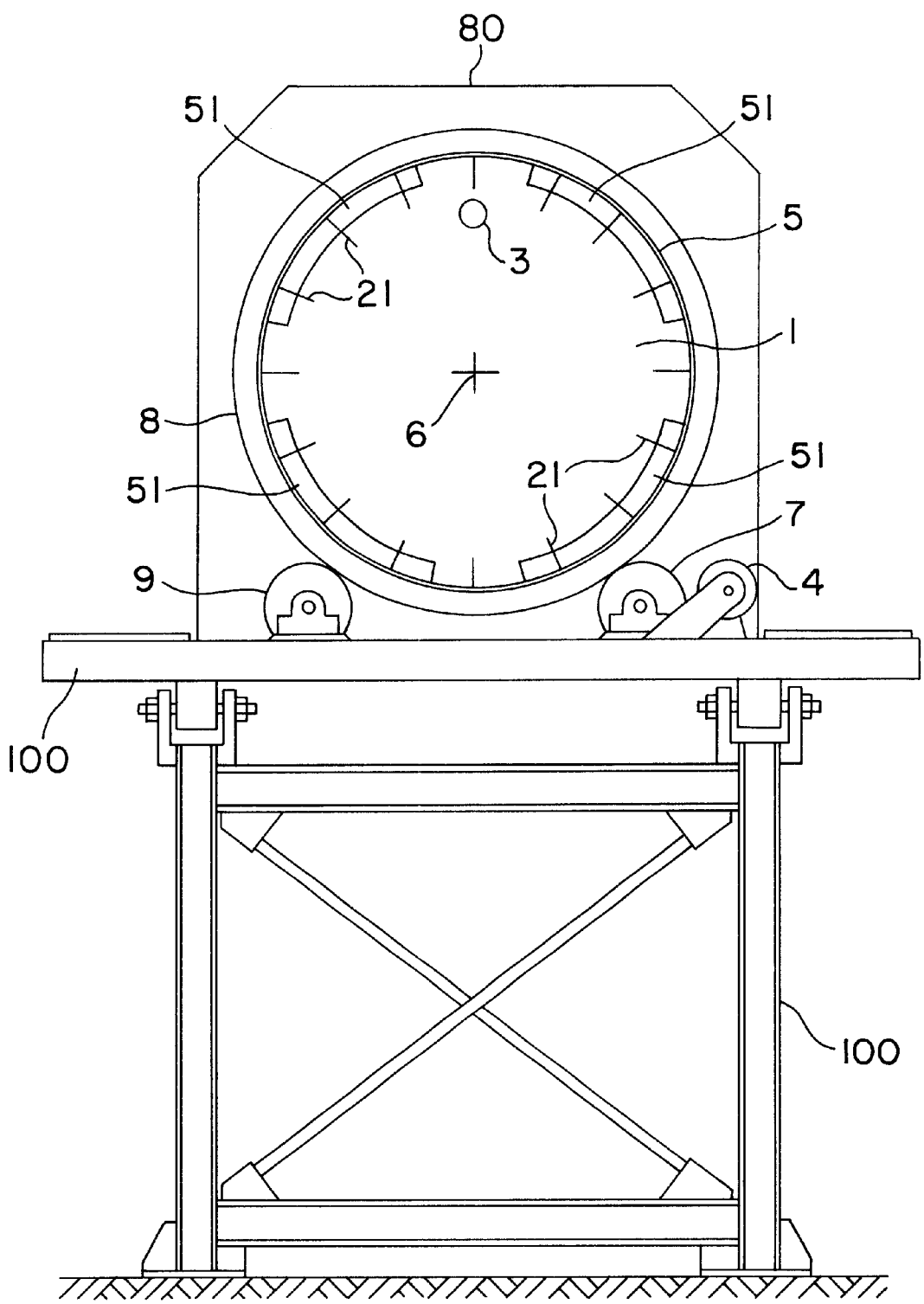
FIG. 2 is a front elevation view of the machine illustrated in FIG. 1.

The products treated by the machine according to the invention are generally inserted in the form of bales 10, or in aggregated or single forma, by means of a conveyor 12 that unloads them inside the drum 5 through a front inlet 1. The machine is mounted on a support frame 100 and is equipped with a casing 80 inside which the drum 5 is partially lodged.

For simplicity, the section view of FIG. 1 illustrates only one portion of the drum 5 in detail, the remaining portion being symmetrical with respect to the axis of rotation 6. The drum 5, substantially cylindrical in form, is set in rotation around his longitudinal axis 6 by means of a pair of electric motors 4 located in proximity to the longitudinally opposite extremities of the drum 5. The rotational drive is achieved in a known way by means of driver rollers 7 that act on a gear ring 8 external to the drum 5 and respective free-wheel rollers 9.

There is a pipe 3 inside the drum 5, substantially parallel to the axis of rotation 6, that is fitted with a plurality of nozzles to allow a treatment fluid 2 to be introduced inside the drum 5.

The drum 5 comprises a first entry section 20, that can be equipped either with a continuous side wall or with a perforated side wall, a second section 30 having a perforated side wall and a third section 40 having a discontinuous side wall. At the opposite end with respect to the is first entry section 20, there is provided a trailing section 60 with a central opening having diameter substantially equal to that of the drum 5.

The first entry section 20 is located immediately downstream of the inlet 1 and comprises a plurality of internal blades 21 that project radially towards the interior of the drum 5. In this section there are carried out an initial disaggregation of the blocks of the products in aggregated form and a pre-washing which allows to soften and remove a considerable part of the waste material (for instance labels or the like) from the same products. This is due to the mechanical action of the impact of the blocks of products against the blades 21 and to the softening action of the treatment fluid 2, the latter being introduced into the drum 5 through the nozzles of the pipe 3. The treatment can also be probably carried out with heated fluid and/or with the addition of suitable chemical compounds increasing the effectiveness of the action of the fluid itself on the products.

The blades 21 are preferably of the detachable type, in such a way to allow the same to be arranged on the internal wall of the drum 5 with the most suitable distribution, and can have different shapes.

Taking the flow of the products in the machine as reference, downstream of the first entry section 20 it is provided a second section 30 having perforated side wall, comprised preferably of a plurality of perforated panels 31 of the detachable type. In correspondence to the section 30 the treatment fluid 2 is expelled through a first outlet 35 located in the lower part of the casing 80. The treatment fluid takes with it a large part of the waste material having dimensions smaller than the holes of the panels 31.

The action of evacuation of waste material is further facilitated by the continuous feeding of the treatment fluid 2 through some of the nozzles on the pipe 3 which are arranged to direct flow toward the outlet 35. In any case, the perforated wall provided in the second section 30, and probably also in the first entry section 20, together with the outlet 35 located under the section 30, allow to avoid the stagnation of the treatment fluid inside the machine and, consequently, the filling of the treated products (for example bottles) with the treatment fluid.

The perforated detachable panels 31 that comprise the side wall of section 30 allow the waste material to be evacuated in this section to be selected on the basis of its typical dimensions.

Immediately downstream of the second section 30, the drum 5 comprises a third section 40 having a discontinuous side wall. In correspondence of this section of the drum 5, the individual products are unloaded one at a time through a second outlet 45 located in the lower part of the casing 80. In order to allow to perform this operation, the discontinuous side wall of the third section 40 is formed from a plurality of rods 41 arranged in reciprocally equidistant positions. The rods 41 are preferably of the detachable type, so as to be positioned in order to obtain ports having suitable dimensions as a function of the dimensions of the products to be treated.

At the opposite end with respect to the first entry section 20, the drum 5 is provided with a trailing section 60 having a central opening and one or more vanes 51 arranged on the internal surface. The central opening leads into a chamber 50 located immediately downstream to the drum 5 and formed at one extremity of the casing 80. In the chamber 50 there are conveyed any possible foreign matters having dimensions greater than those of the products and that cannot be evacuated through the outlet 45 located upstream. These foreign matters exiting from the drum 5 are thus evacuated through an outlet 55 located in the lower part of the chamber 50.

The vanes 51 located in the trailing section 60 are shaped and oriented in such a way as to cause, during the rotation of the drum, a thrust action towards the third section 40 on at least part of the materials reaching the trailing section 60. This allows to carry back the singularized products, but not even evacuated, towards the ports provided in the third section 40 of the drum 5, while the foreign matters having dimensions greater than those of the products can cross the trailing section 60 and thus be expelled from the machine.

The products introduced into the machine are therefore conveyed gradually and in a continuous way to each of the sections of the drum 5, in which the products 10 are subjected to a disaggregation phase of the bales 10, or of fractions of the same, and to a pre-washing phase, without it being necessary to separate the different sections of the drum 5 with walls or dividing partitions.

In these phases, the duration of the treatment to which the products are subjected before being expelled through the outlet 45 is a particular important aspect for the effectiveness of the same treatment. In the machine according to the invention, the duration of the treatment can be advantageously regulated in two separate ways, i.e. either by varying the angle of inclination of the axis of rotation 6 of the drum 5 and/or by regulating the speed of rotation imparted to the same drum.

There are means 110 on the support frame 100 that allow the angle of inclination of the support frame 100 with respect to the ground and, consequently, the angle $\alpha$ of inclination of the axis of rotation 6 of the drum 5, to be varied, thus imparting a slight downward slope towards the section of the drum most remote from the inlet 1. The angle $\alpha$ may be varied continuously by using threaded means, hydraulic rams or other known means. A further regulation of the treatment time can be achieved by means for varying the speed of rotation of the motors 4, thus imparting to the drum 5 a desired speed. Thus it is possible to regulate the time of treatment of the products in the machine in a particularly accurate and effective way.

In the case in which a heated treating fluid is used, thermal insulation coverings arranged on the casing 80 could be provided and, if necessary, also partly on the drum 5.

In the embodiment shown by way of example in FIG. 1, a thermal insulation covering 26 is arranged on the external surface of the drum 5 at least in correspondence to the first entry section 20, in case the same is provided for example with a continuous side wall. Another portion of thermal insulation covering is located in correspondence of the trailing section 60.

A further covering 86 made of thermal insulation material is arranged on the casing 80 at least in correspondence to the sections 30 and 40 with discontinuous or perforated side walls, as well as in correspondence with the chamber 50. A detachable coverage in thermal insulation material is also preferably arranged (even if not shown for reasons of simplicity), in correspondence of the conveyor 12, in such a way as to maintain thermally insulated also the inlet 1 without hampering the feeding of the products to the machine. In this way, the machine is thermally insulated for all its length, allowing the dispersion of heat toward the outside to be limited during operation in case a heated treating fluid is used.

In case the first entry section 20 of the drum 5 is provided with a perforated side wall, the drum 5 will be completely lodged into the casing 80 and the thermal insulation covering will be only present onto the latter. In this case, the casing 80 will comprise also a (conduit 81 shown in dotted lines) to collect the treatment fluid expelled from the perforated wall of the first entry section 20 and to convey the same towards the first outlet 35 in order to avoid stagnation of treatment fluid into the machine.

What is claimed is:

1. A machine for the treatment of products made of a recyclable plastic material, in which said products are inserted in the form of blocks having a plurality of compacted singularized products, the machine comprising a drum mounted for rotation about its own axis, at least one inlet for the introduction of said products in a first entry section of said drum, means for feeding a treatment fluid to the inside of said drum, at least a second section having a perforated side wall and at least a third section having a discontinuous side wall, wherein said second section has a perforated side wall formed by a plurality of perforated panels with holes for evacuating waste material from the machine, and wherein said third section has a discontinuous side wall formed by rods arranged in equidistant relationship in such a way as to form a plurality of exit ports through which pass the singularized products.

2. A machine according to claim 1, wherein said first entry section is located immediately downstream of said inlet and comprises a continuous side wall.

3. A machine according to claim 1, wherein said first entry section is located immediately downstream of said inlet and comprises a perforated side wall.

4. A machine according to claim 1, characterized in that said drum comprises a plurality of radially projecting blades oriented toward the interior and that said blades are located at least in said first entry section.

5. A machine according to claim 1, wherein said second section having a perforated side wall is located immediately downstream of said first entry section with respect to the flow of said products inside said drum.

6. A machine according to claim 1, wherein the panels forming said second section are detachable from the second section.

7. A machine according to claim 1, wherein said third section is located immediately downstream of said second section with respect to the flow of said products inside said drum.

8. A machine according to claim 1, wherein the rods forming said third section are detachable from the third section.

9. A machine according to claim 1, characterized in that said drum comprises a trailing section having a central opening and located downstream to said third section, said trailing section being provided with one or more oriented vanes in order to cause a thrust action towards said third section on at least part of the materials reaching said trailing section.

10. A machine according to claim 1, characterized in that said first entry section, said second section, said third section and said trailing section of said drum are axially arranged one after the other without separation walls between the same.

11. A machine according to claim 1, further comprising means for varying the angle of inclination of the axis rotation of said drum with respect to the ground, with inclination being toward said trailing section.

12. A machine according to claim 1, further comprising means for regulating the speed of rotation of said drum.

13. A machine according to claim 1, characterized in that at least part of said drum is lined externally with thermal insulating material.

14. A machine according to claim 1, characterized in that at least part of said rotating drum is housed inside a casing.

15. A machine according to claim 14, characterized in that at least part of said casing is lined with thermal insulating material.

16. A machine according to claim 14, characterized in that said casing is provided with at least one first outlet arranged in its lower part in correspondence to the second section of said drum to allow the outflow of said treatment fluid and of waste materials removed from and/or released by said products.

17. A machine according to claim 14, characterized in that said casing comprises at least a conduct to convey the treatment fluid coming from said first entry section towards said at least one first outlet.

18. A machine according to claim 14, characterized in that said casing is provided with at least one second outlet arranged in its lower part in correspondence to the third section of said drum to allow the exit of said products one at a time.

19. A machine according to claim 14, characterized in that said casing is provided with at least one third outlet arranged in its lower part downstream of said drum to allow the exit of foreign matters having dimensions substantially greater than the dimensions of said products.

20. A machine according to claim 1, characterized in that said means for feeding a treatment fluid to the inside of said drum comprise a pipe placed inside said drum and a plurality of nozzles arranged on said pipe in correspondence to said first entry section and to at least part of said second section having a perforated side wall.

* * * * *

UNITED STATES PATENT AND TRADEMARK OFFICE
CERTIFICATE OF CORRECTION

PATENT NO. : 6,568,410 B1
DATED : May 27, 2003
INVENTOR(S) : Piergiorgio Teruggi et al.

It is certified that error appears in the above-identified patent and that said Letters Patent is hereby corrected as shown below:

Column 8,
Line 7, reads "axis," should read -- axis of --

Signed and Sealed this

Twenty-seventh Day of July, 2004

JON W. DUDAS
*Acting Director of the United States Patent and Trademark Office*